United States Patent
Chikuba et al.

(10) Patent No.: US 6,505,394 B2
(45) Date of Patent: *Jan. 14, 2003

(54) METHOD FOR CUTTING RARE EARTH ALLOY, METHOD FOR MANUFACTURING RARE EARTH ALLOY PLATES AND METHOD FOR MANUFACTURING RARE EARTH ALLOY MAGNETS USING WIRE SAW, AND VOICE COIL MOTOR

(75) Inventors: Masanori Chikuba, Osaka (JP); Hazime Ishida, Osaka (JP)

(73) Assignee: Sumitomo Special Metals Co., Ltd. (JP)

(*) Notice: Subject to any disclaimer, the term of this patent is extended or adjusted under 35 U.S.C. 154(b) by 0 days.

This patent is subject to a terminal disclaimer.

(21) Appl. No.: 09/918,534

(22) Filed: Aug. 1, 2001

(65) Prior Publication Data
US 2001/0042299 A1 Nov. 22, 2001

Related U.S. Application Data

(62) Division of application No. 09/234,102, filed on Jan. 19, 1999, now Pat. No. 6,381,830.

(30) Foreign Application Priority Data

Sep. 1, 1998 (JP) ............................. 10-247519

(51) Int. Cl.⁷ ............................. B23P 13/04; B26D 1/44; B28D 1/06
(52) U.S. Cl. ................. 29/557; 83/651.1; 125/16.02; 125/21; 451/60; 451/446
(58) Field of Search .................... 29/557, 416, 145; 83/651.1, 171; 125/16.02, 21, 16.01; 451/60, 446

(56) References Cited

U.S. PATENT DOCUMENTS

| | | | |
|---|---|---|---|
| 4,250,421 A | * | 2/1981 | Masuda et al. ............. 310/156 |
| 4,457,851 A | | 7/1984 | Tabaru et al. |
| 4,745,345 A | | 5/1988 | Petersen |
| 4,770,723 A | | 9/1988 | Sagawa et al. |
| 5,201,305 A | * | 4/1993 | Takeuchi ...................... 125/21 |
| 5,260,618 A | | 11/1993 | Dunfield et al. |
| 5,337,472 A | * | 8/1994 | Leupold et al. ............... 29/415 |
| 5,575,189 A | | 11/1996 | Kiuchi et al. |
| 5,739,975 A | | 4/1998 | Parks et al. |
| 5,759,391 A | | 6/1998 | Stadtmuller |
| 5,830,369 A | * | 11/1998 | Toyama ...................... 210/773 |
| 5,834,663 A | | 11/1998 | Fukuno et al. |

(List continued on next page.)

FOREIGN PATENT DOCUMENTS

| | | |
|---|---|---|
| EP | 0 344 542 | 12/1989 |
| EP | 0 503 860 | 9/1992 |
| EP | 0 824 055 | 2/1998 |

(List continued on next page.)

OTHER PUBLICATIONS

European Search Report, Application No. 99100826.9–2302, Dated: Jul. 23, 2002.

Primary Examiner—Gregory M. Vidovich
Assistant Examiner—Marc Jimenez
(74) Attorney, Agent, or Firm—Nixon Peabody LLP; Jeffrey L. Costellia (57) ABSTRACT

A method for cutting a rare earth alloy according to the present invention includes the steps of: a) supplying slurry containing abrasive grains onto a wire; and b) machining the rare earth alloy with the abrasive grains, interposed between the wire and the rare earth alloy, by running and pressing the wire against the rare earth alloy. The slurry contains, as a main component, oil in which the abrasive grains are dispersed, and the viscosity of the slurry at 25° C. is in the range from 92 to 175 mPa·sec.

10 Claims, 10 Drawing Sheets

U.S. PATENT DOCUMENTS

| | | | |
|---|---|---|---|
| 5,896,851 A | 4/1999 | Katamachi et al. | |
| 5,907,988 A | 6/1999 | Kiuchi et al. | |
| 5,910,203 A | 6/1999 | Hauser | |
| 5,937,844 A | 8/1999 | Kiuchi et al. | |
| 6,006,738 A | 12/1999 | Itoh et al. | |
| 6,045,629 A | 4/2000 | Hasegawa et al. | |
| 6,065,461 A | 5/2000 | Asakawa et al. | |
| 6,143,193 A | 11/2000 | Akioka et al. | |
| 6,329,894 B1 * | 12/2001 | Kanekiyo et al. | 335/302 |
| 6,381,830 B1 * | 5/2002 | Chikuba et al. | 29/557 |

FOREIGN PATENT DOCUMENTS

| | | | | |
|---|---|---|---|---|
| EP | 0 59 478 | | 11/1999 | |
| FR | 2 704 455 | | 11/1994 | |
| JP | 55-94573 | * | 7/1980 | |
| JP | 63-023962 | | 7/1988 | |
| JP | 02-19460 | | 2/1990 | |
| JP | 02-074160 | | 6/1990 | |
| JP | 04-216897 | | 8/1992 | |
| JP | 5-62824 | * | 3/1993 | |
| JP | 05-96461 | | 4/1993 | |
| JP | 5-092420 | | 4/1993 | |
| JP | 05-169434 | | 7/1993 | |
| JP | 05-220732 | | 8/1993 | |
| JP | 06-071195 | | 3/1994 | |
| JP | 6-283333 | * | 10/1994 | 335/296 |
| JP | 6-295809 | | 10/1994 | |
| JP | 07-106288 | | 4/1995 | |
| JP | 07-195358 | | 8/1995 | |
| JP | 7-285073 | | 10/1995 | |
| JP | 08-057847 | | 3/1996 | |
| JP | 08-057848 | | 3/1996 | |
| JP | 08-243920 | | 9/1996 | |
| JP | 08-295875 | | 11/1996 | |
| JP | 9-100466 | | 4/1997 | |
| JP | 09-109014 | | 4/1997 | |
| JP | 09-168971 | | 6/1997 | |
| JP | 9-193140 | * | 7/1997 | |
| JP | 9-207127 | * | 8/1997 | |
| JP | 09-216222 | | 8/1997 | |
| JP | 9-254005 | * | 9/1997 | |
| JP | 09-272122 | | 10/1997 | |
| JP | 09-290361 | | 11/1997 | |
| JP | 10-034011 | | 2/1998 | |
| JP | 10-086143 | | 4/1998 | |
| JP | 10-100141 | * | 4/1998 | |
| JP | 10-237479 | | 9/1998 | |
| JP | 10-296719 | | 11/1998 | |
| JP | 10-306275 | | 11/1998 | |
| JP | 10-306276 | | 11/1998 | |
| JP | 10-324889 | * | 12/1998 | |
| JP | 02-131858 | | 5/1999 | |
| JP | 2000-12317 | * | 1/2000 | |
| WO | WO 98/35364 | | 8/1998 | |

* cited by examiner

METHOD FOR CUTTING RARE EARTH ALLOY, METHOD FOR MANUFACTURING RARE EARTH ALLOY PLATES AND METHOD FOR MANUFACTURING RARE EARTH ALLOY MAGNETS USING WIRE SAW, AND VOICE COIL MOTOR

This application is a division of U.S. Ser. No. 09/234,102 filed Jan. 19, 1999 now U.S. Pat. No. 6,381,830.

BACKGROUND OF THE INVENTION

The present invention relates to respective methods for cutting a rare earth alloy, manufacturing rare earth alloy plates and manufacturing rare earth alloy magnets with a wire saw, and also relates to a voice coil motor including the rare earth alloy magnet.

A technique of cutting an ingot of silicon with a wire saw to slice the ingot into a large number of wafers is disclosed in Japanese Laid-Open Publication No. 6-8234. In accordance with such a technique, a large number of wafers, each having a constant thickness, can be simultaneously sliced from an ingot by cutting the ingot with a multi-wire running while supplying some slurry containing abrasive grains thereto.

On the other hand, in accordance with a known technique, an ingot of a rare earth alloy is sliced using a rotating dicing blade, for example. However, such a technique using a dicing blade requires an undesirably large cutting margin, because the cutting edge of a dicing blade is thicker than that of a wire. Therefore, such a technique cannot contribute to efficient use of valuable resources. A rare earth alloy is suitable for use as a magnet material, for instance. A magnet has found a wide variety of applications and is now broadly used for various types of electronic appliances. Under the circumstances such as these, it is highly desirable to cut down on the manufacturing cost per a rare earth magnet. And the cost would be considerably reduced if a great number of wafers could be produced simultaneously from an ingot of a rare earth alloy such that a cutting margin can be reduced by the use of a wire saw and that each wafer has a constant thickness.

However, no one has ever reported on successfully cutting a rare earth alloy in accordance with a practical wire-saw technique. The present inventors experimentally cut an ingot of a rare earth alloy with a wire saw. As a result, we found that since a slurry-circulating pipe was clogged up in a very short amount of time with fine powder and grinding debris (i.e., swarf or sludge) involved with wire sawing, no slurry could be supplied to the wire after that, and the wire eventually snapped. If the slurry was entirely replaced every several hours in order to avoid this problem, then wire sawing had to be suspended for a while every time the slurry was replaced. Thus, such machining is not suitable for mass production and it is virtually impossible to put such machining into practice. We also observed that since the sludge was easily deposited in a cutting groove, the cutting resistance noticeably increased and the wire was even more likely to snap as a result. Furthermore, the cutting accuracy was found considerably deteriorated because various unwanted operating failures frequently happened during the cutting process. For example, the wire often disengaged from rollers, around which the wire was wound, because the sludge was also likely to be deposited on the grooves of the rollers. None of these problems has ever been observed during cutting an ingot of silicon or glass in accordance with a conventional wire saw technique.

SUMMARY OF THE INVENTION

A prime object of the present invention is providing respective methods for cutting a rare earth alloy and manufacturing rare earth alloy plates with a wire saw to ensure a long-time continuous operation by preventing wire snapping and by drastically reducing the number of times the slurry is replaced.

Another object of the present invention is providing a method for manufacturing rare earth alloy magnets using the method for cutting a rare earth alloy.

Still another object of the present invention is providing a voice coil motor including a rare earth alloy magnet manufactured by the method of the present invention.

A method for cutting a rare earth alloy according to the present invention includes the steps of: a) supplying slurry containing abrasive grains onto a wire; and b) machining the rare earth alloy with the abrasive grains, interposed between the wire and the rare earth alloy, by running and pressing the wire against the rare earth alloy. The slurry contains, as a main component, oil in which the abrasive grains are dispersed, and the viscosity of the slurry at 25° C. is in the range from 92 to 175 mPa·sec.

In one embodiment of the present invention, sludge of the rare earth alloy involved with the step b) is separated from the slurry by a magnetic field.

In another embodiment, a magnet separator is used to generate a magnetic field of 0.3 tesla or more in a region through which the sludge is recovered.

In still another embodiment, the running speed of the wire is set in the range from 420 to 760 meters per minute.

In still another embodiment, a wire saw machine is used. The wire saw machine includes: a plurality of rollers rotatably supported, a plurality of ring-shaped grooves being formed on the outer circumference of each said roller at a predetermined pitch; and driving means for rotating the rollers and running the wire wound around the grooves of the rollers.

In still another embodiment, the surface of the outer circumference of each said roller is coated with ester-based urethane rubber.

In still another embodiment, the depth of the grooves of each said roller is set at 0.3 mm or more.

In still another embodiment, the rare earth alloy is cut while the rare earth alloy is lowered downward closer to the running wire.

In still another embodiment, the rare earth alloy is held after the rare earth alloy has been divided into a plurality of blocks, and at least part of the slurry is supplied through a gap between the blocks.

Another method for cutting a rare earth alloy according to the present invention includes the steps of: a) supplying slurry containing abrasive grains onto a wire; and b) machining the rare earth alloy with the abrasive grains, interposed between the wire and the rare earth alloy, by running and pressing the wire against the rare earth alloy. The slurry contains, as a main component, oil in which the abrasive grains are dispersed. And sludge of the rare earth alloy involved with the step b) is separated from the slurry by a magnetic field.

Still another method for cutting a rare earth alloy according to the present invention includes the steps of: a) supplying slurry containing abrasive grains onto a wire; and b) machining the rare earth alloy with the abrasive grains, interposed between the wire and the rare earth alloy, by running and pressing the wire against the rare earth alloy. The slurry contains, as a main component, oil in which the abrasive grains are dispersed. A wire saw machine is used, and includes: a plurality of rollers rotatably supported, a plurality of ring-shaped grooves being formed on the outer circumference of each said roller at a predetermined pitch; and driving means for rotating the rollers and running the wire wound around the grooves of the rollers. And the rare earth alloy is held after the rare earth alloy has been divided into a plurality of blocks, and at least part of the slurry is supplied through a gap between the blocks.

Yet another method for cutting a rare earth alloy according to the present invention includes the steps of: a) supplying slurry containing abrasive grains onto a wire; and b) machining the rare earth alloy with the abrasive grains, interposed between the wire and the rare earth alloy, by running and pressing the wire against the rare earth alloy. The slurry contains, as a main component, oil in which the abrasive grains are dispersed. A wire saw machine is used, and includes: a plurality of rollers rotatably supported, a plurality of ring-shaped grooves being formed on the outer circumference of each said roller at a predetermined pitch; and driving means for rotating the rollers and running the wire wound around the grooves of the rollers. The depth of the grooves of each said roller is set at 0.3 mm or more.

A method for manufacturing rare earth alloy plates according to the present invention includes the steps of: forming an ingot of a rare earth alloy; and separating a plurality of rare earth alloy plates from the ingot of the rare earth alloy. The separating step includes the steps of: supplying slurry containing abrasive grains onto a wire; and machining the ingot with the abrasive grains, interposed between the wire and the ingot, by running and pressing the wire against the ingot. The slurry contains, as a main component, oil in which the abrasive grains are dispersed, and the viscosity of the slurry at 25° C. is in the range from 92 to 175 mPa·sec.

A method for manufacturing rare earth alloy magnets according to the present invention includes the steps of: making a sinter out of a rare earth magnetic alloy powder; and separating a plurality of rare earth alloy magnets from the sinter. The separating step includes the steps of: supplying slurry containing abrasive grains onto a wire; and machining the sinter with the abrasive grains, interposed between the wire and the sinter, by running and pressing the wire against the sinter. The slurry contains, as a main component, oil in which the abrasive grains are dispersed, and the viscosity of the slurry at 25° C. is in the range from 92 to 175 mPa·sec.

The voice coil motor of the present invention includes a rare earth alloy magnet manufactured by performing the steps of: making a sinter out of a rare earth magnetic alloy powder; and separating a plurality of rare earth alloy magnets from the sinter. The separating step includes the steps of: supplying slurry containing abrasive grains onto a wire; and machining the sinter with the abrasive grains, interposed between the wire and the sinter, by running and pressing the wire against the sinter. The slurry contains, as a main component, oil in which the abrasive grains are dispersed, and the viscosity of the slurry at 25° C. is in the range from 92 to 175 mPa·sec.

In one embodiment of the present invention, the thickness of the rare earth alloy magnet is in the range from 0.5 to 3.0 mm.

DESCRIPTION OF THE PREFERRED EMBODIMENTS

The present inventors found that when a rare earth alloy was cut with a wire saw, sludge of the rare earth alloy, resulting in oily slurry during the machining, quickly precipitated in the slurry and aggregated in a short amount of time. Based on this result, we regarded this phenomenon as a principal factor of preventing cutting a rare earth alloy with a wire saw from being put into practice. If the aggregated sludge obstructs the circulation of the slurry in a slurry-circulating pipe of a wire saw machine, then the slurry-circulating pipe is clogged up. Accordingly, it is impossible to carry out a long-time continuous operation unless the slurry is replaced frequently.

The sludge precipitates and aggregates probably because the atomic weight of a rare earth element as a component of a rare earth alloy is relatively large and because the specific gravity of the sludge is larger than that of the oil in the slurry. Oil having a viscosity as high as about 90 mPa·sec (at 25° C.) is selected as the oil for the slurry such that the abrasive grains, having a larger specific gravity than that of the oil, are well dispersed in the slurry. The specific gravities of SiC, diamond and alumina ($Al_2O_3$), ordinarily used as abrasive grains, are in an approximate range from about 3 to about 4. The specific gravity of sludge caused when silicon or quartz glass is cut with a wire saw is also about 3 to about 4. Accordingly, if an ingot of silicon or quartz glass is cut in accordance with a wire saw technique, the sludge, as well as abrasive grains, is likely to be uniformly dispersed in the slurry, and hardly precipitates or aggregates. Therefore, no serious problems have ever been caused because of such precipitation or aggregation.

The problem of sludge aggregation seems to be solved by increasing the viscosity of slurry, because the sludge of a rare earth alloy could be dispersed more uniformly and more easily in the oil in such a case. However, we confirmed based on experimental results that various problems like wire snapping still happened even when the viscosity of the slurry was set higher. This is probably because the cutting resistance of a rare earth alloy is far higher than that of silicon, for example. In view of these facts, the present inventors intentionally set the viscosity of slurry at a lower value than a conventional one, thereby increasing the cleanability or discharge efficiency of the sludge and reducing the cutting resistance of the rare earth alloy. And we decided to separate and remove the sludge from the slurry by a magnetic field in consideration of the properties of the sludge of a rare earth alloy. Specifically, the sludge is hard to be dispersed but is easily attracted to a magnet. By taking these measures, clogging can be eliminated from the inside of a circulating pipe, slurry no longer needs to be replaced so frequently, and the cutting machine can be operated continuously for a tremendously longer period of time compared to the prior art.

It is noted that when the alloy sludge is attracted by the magnetic field, the sludge sometimes receives strong resistance depending on the viscosity of the oil. However, according to the present invention, the viscosity of oil used is set low and a magnet generating a strong magnetic field is employed. Accordingly, the sludge can be separated sufficiently and practically.

Hereinafter, preferred embodiments of the present invention will be described with reference to the accompanying drawings.

First, an exemplary method for manufacturing rare earth alloy plates according to the present invention will be described. In this embodiment, a ternary rare earth alloyed compound Nd—Fe—B, mainly composed of neodymium (Ne), iron (Fe) and boron (B), may be used. Alternatively, a rare earth alloyed compound, in which Dy (dysprosium) and Co (cobalt) are substituted for part of Nd and part of Fe, respectively, in Nd—Fe—B, may also be used. Nd—Fe—B is known as a material for a very strong neodymium magnetic having a maximum energy product exceeding 320 kJ/m$^3$.

A method for producing an ingot of Nd—Fe—B will be briefly described with reference to the flowchart illustrated in FIG. 1. For more details about a method for preparing a rare earth alloy as a magnet material, see U. S. Pat. No. 4,770,723, for example.

Figure 1:
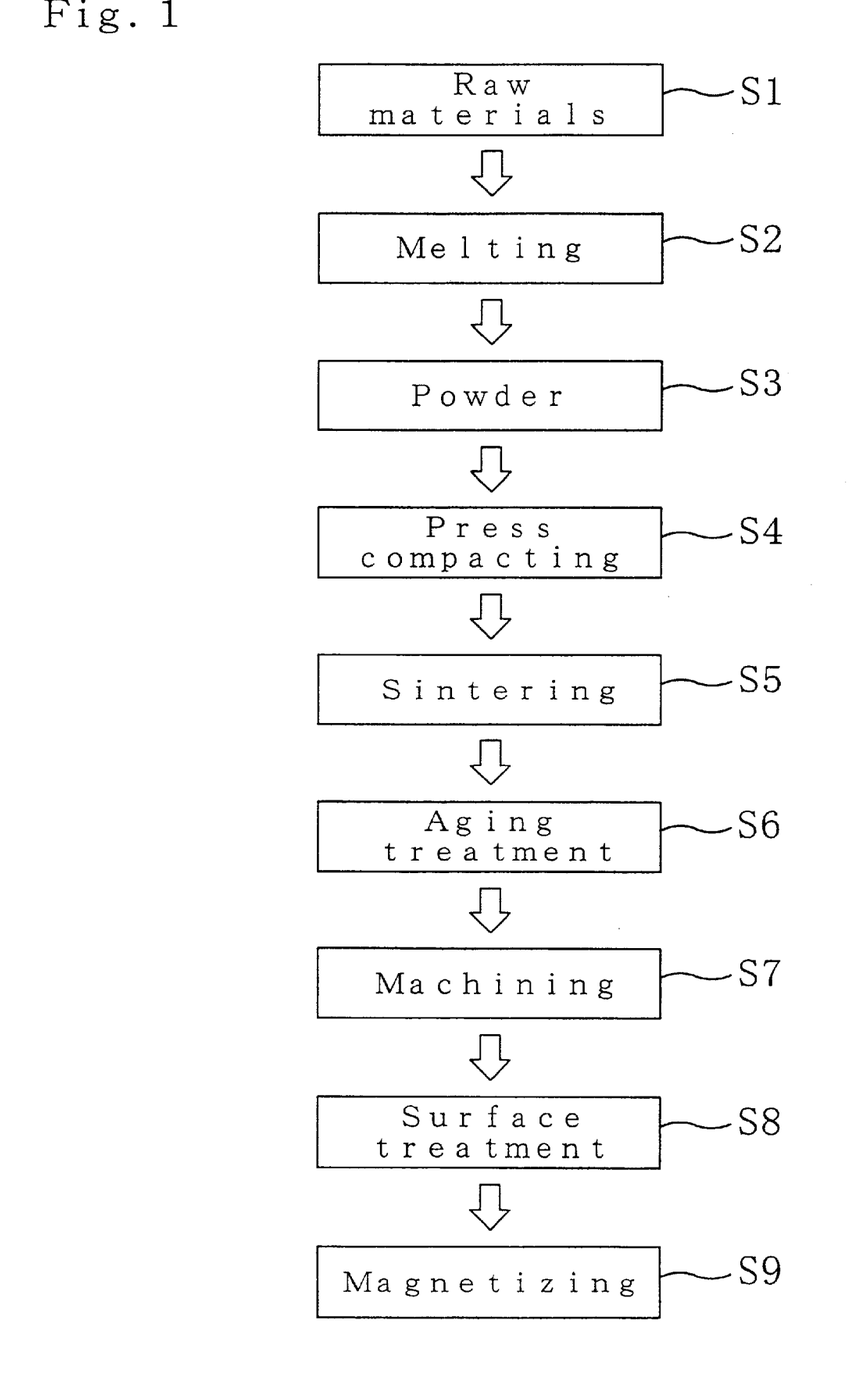
FIG. 1 is a flowchart illustrating the procedure of forming an Ne-Fe-B permanent magnet.

First, in Step S1 shown in FIG. 1, raw materials are exactly scaled at a predetermined ratio of mole fractions. Then, in Step S2, the raw materials are melted in a high-frequency melting furnace in vacuum or within an argon gas ambient. The molten raw materials are cast into a water-cooled mold, thereby preparing a raw material alloy at the predetermined ratio. Next, in Step S3, the raw material alloy is pulverized to prepare fine powder having a mean particle size of about 3 to about 4 $\mu$m. Subsequently, in Step S4, the fine powder is introduced into a die assembly and subjected to press compacting in a magnetic field. During this process step, the press compacting is performed after the fine powder has been mixed with a caking additive if necessary. Then, in Step S5, a source material of a neodymium magnet is formed by conducting a sintering process at about 1,000° C. to about 1,200° C. Thereafter, in Step S6, an aging treatment is performed at about 600° C. in order to increase the coercive force of the magnet. An ingot of a rare earth alloy can be prepared in this manner. The size of the ingot is 30 mm×50 mm×60 mm, for example.

In Step S7, the ingot of the rare earth alloy is cut and machined, thereby slicing the ingot into a plurality of thin plates (these plates will be called sometimes "substrates" and sometimes "wafers"). Before the steps from Step S8 on are described, a method for cutting the ingot of a rare earth alloy in accordance with the wire saw technique of the present invention will be described in detail below.

Figure 2A:
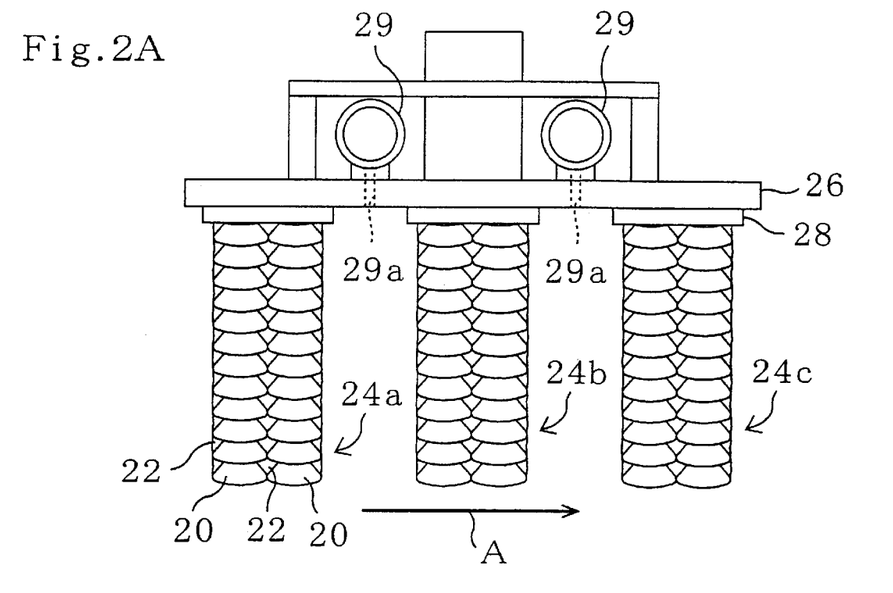
FIG. 2A is a front view of blocks of ingots secured to a work plate.
Figure 2B:
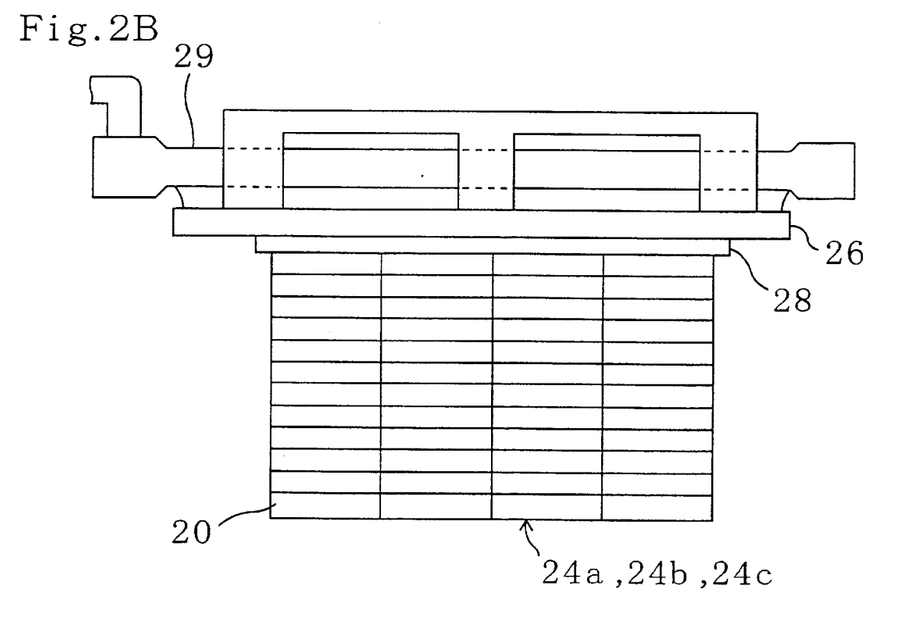
FIG. 2B is a side view thereof.

FIGS. 2A and 2B will be referred to. First, a plurality of ingots 20, produced in accordance with the method described above, are adhered to each other with an adhesive 22 made of an epoxy resin, for example. And the ingots 20 are secured to a ferrous work plate 26 after these ingots have been stacked one upon the other to form a plurality of blocks 24a through 24c. The work plate 26 and the blocks 24a through 24c are also adhered to each other with the adhesive 22. More specifically, a base plate 28 made of carbon is placed as a dummy between the work plate 26 and each of the blocks 24a through 24c. The carbon base plates 28 are also adhered to the work plate 26 and the blocks 24a through 24c with the adhesive 22. The carbon base plates 28 are cut by a wire saw after the blocks 24a through 24c have been cut and until the work plate 26 stops lowering. That is to say, the base plates 28 function as a dummy for protecting the work plate 26.

In this embodiment, the size of each of the blocks 24a through 24c is designed at about 100 mm when measured in the direction indicated by the arrow A in FIG. 2A (hereinafter, this direction will be called a "wire running direction"). Since the size of each ingot 20 measured in the wire running direction is about 50 mm in this embodiment, each of the blocks 24a through 24c is made up by stacking a pair of ingots 20, disposed side by side in the wire running direction, one upon the other.

Also, in this specification, the ingots 20 secured to the work plate 26 will be collectively called as "work". By dividing this work into a plurality of blocks, the following effects can be attained.

If the size of a mass of work in the wire running direction is so large as to exceed the maximum distance the slurry can reach, then the slurry cannot be supplied sufficiently to some of the regions of the work to be cut. As a result, a wire possibly snaps. However, since the work of this embodiment is divided into blocks 24a through 24c of an appropriate size, the slurry can be supplied into the gaps between the blocks 24a through 24c and therefore the problem of insufficiently supplied slurry can be solved. In this embodiment, two slurry supply pipes 29 are disposed on the work plate 26 to supply the slurry into the gaps between the blocks 24a through 24c. And slurry containing fresh abrasive grains is sprayed downward from the slurry supply pipes 29 and through slit-shaped nozzles 29a. The slurry supply pipes 29 receive fresh slurry not containing sludge or slurry, from which the sludge has been removed, from a slurry supply tank (described later). The slurry supply pipes 29 have a double pipe structure, for example. And the width of each of the slits 29a under the pipes 29 changes in the longitudinal direction and is designed to supply the slurry uniformly. An exemplary structure of slurry supply means usable as the slurry supply pipes 29 is disclosed in Japanese Laid-Open Publication No. 7195358, for example.

In this embodiment, the work is divided into a plurality of blocks. However, the size of each of the blocks 24a through 24c when measured in the wire running direction is variable with the viscosity of the slurry and the wire running speed. The number and disposition of ingots 20 making up one block are also variable with the size of each ingot 20. Accordingly, the work should be appropriately divided into blocks of an optimum size in view of these factors.

Figure 3A:
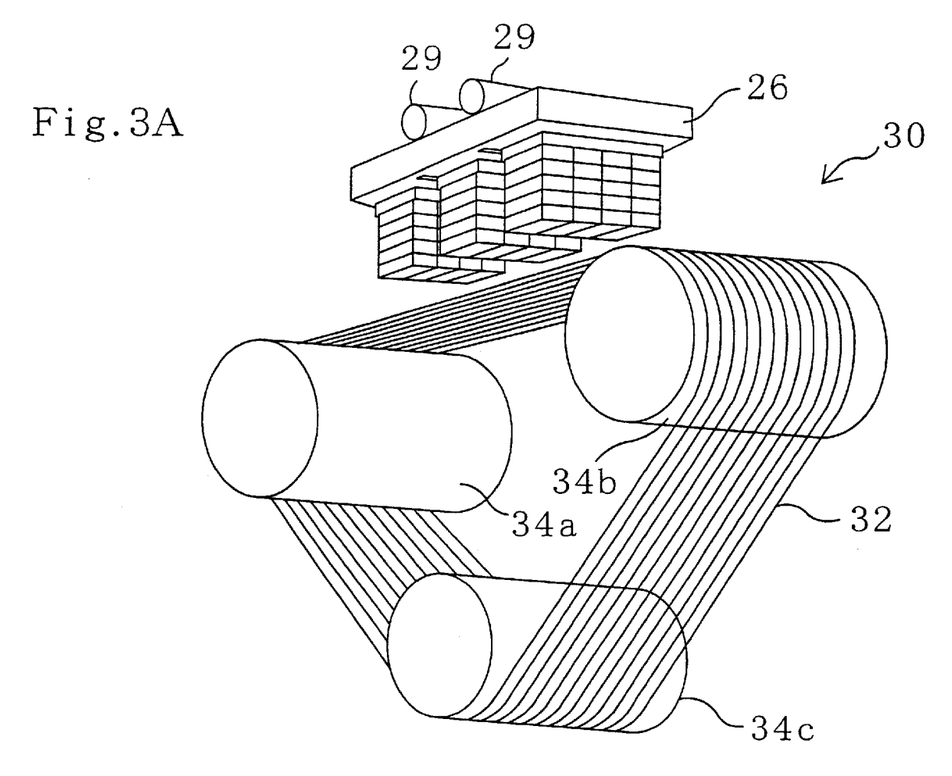
FIG. 3A is a perspective view illustrating the main portion of a wire saw machine preferably used in an embodiment of the present invention.

Next, the main portion 30 of the wire saw machine preferably used in this embodiment will be described with reference to FIGS. 3A and 3B. This wire saw machine includes three main rollers 34a through 34c, around which a single wire 32 can be wound numerous number of times. Among these rollers, two rollers 34a and 34b are rotatably supported by the wire saw machine, but is not directly connected to any driving means such as a motor. Thus, these rollers function as coupled driving rollers. In contrast, the other main roller 34c is connected to a driver such as a motor (not shown), receives desired rotation force from the driver and can rotate at a set speed. The main roller 34c can transmit rotation force to the other two main rollers 34a and 34b via the wire 32, and therefore functions as a driving roller.

The wire 32 is guided while receiving a tension of several kilograms weight in accordance with the rotation of the main rollers 34a through 34c. And the wire 32 is let out from a reel (not shown) and wound on another reel (not shown, either) while running at a predetermined speed in a specified direction (indicated by the arrows A, B and C in FIG. 3B). It is noted that the outer diameter of the main rollers 34a through 34c is about 170 mm and the axial length thereof is about 360 mm in this embodiment.

On the outer surface of each main roller 34a, 34b, 34c, a plurality of grooves are formed at regular intervals as will be described later, and the single wire 32 is wound on each roller so as to be engaged with these grooves. The arrangement pitch of the wire 32 (i.e., a gap between adjacent lines of the wire) is defined by the pitch of the grooves. In this embodiment, this pitch is set at about 2.0 mm. This pitch is set in accordance with the thickness of a thin plate to be sliced off an ingot by cutting, and therefore multi-groove rollers 34a through 34c having an appropriate pitch are selectively used. The wire 32 is made of hard drawn steel wire (e.g., piano wire) and the thickness thereof is set in the range from about 0.06 mm to about 0.25 mm.

During the cutting process, the work is pressed against a portion of the running wire 32 that is stretched between the main rollers 34a and 34b. In this embodiment, the slurry can be supplied onto the wire 32 from at least three points, two of which correspond to the pipes 29 and the slit-shaped nozzles 29a disposed in and above the work plate 26 to supply the slurry through the gaps between the blocks. The other slurry supply point is a nozzle 36 located on the left-hand side of the work in FIG. 3B. Optionally, the slurry may be supplied not only from these nozzles 29a and 36 but also from other nozzles. For example, the slurry may be additionally supplied from the right-hand side of the work in FIG. 3B.

In this embodiment, the components of the slurry are prepared such that the viscosity of the resultant slurry at 25° C. falls within the range from 92 to 175 millipascals per second (mPa·sec). Specifically, oil PS-L-30 manufactured by Palace Chemicals, Co., Ltd. is used. This oil contains not only purified mineral oil (92.0%) as a main component, but also an inorganic thickener (3.0%), a nonionic surfactant (2.2%), an anticorrosive (0.4%) and a dispersant (2.5%).

In this manner, an oil with a low viscosity is used in this embodiment. Thus, the sludge, produced within a cut groove being formed in an ingot of a rare earth alloy, rapidly flows out of the cut groove (i.e., the discharge efficiency is high) and can be eliminated from the region subjected to the cutting process. Accordingly, the sludge deposited within the cut groove does not strongly interfere with the wire's running and the problem of wire snapping owing to the increase in cutting resistance can be solved. In addition, since the viscosity of the slurry used is low, the amount of sludge transported by the running wire to the main rollers can be reduced. As a result, the deposition of the sludge within the grooves of the main rollers can also be suppressed. Furthermore, since the viscosity of the slurry is low, the circulating pipe and the nozzle holes are less likely to be clogged up. Consequently, wire snapping can be prevented and the wire can be easily removed from the work after the work has been cut. It is noted that the lower the viscosity of the slurry is, the more likely the slurry drips from the running wire. However, since a sufficient amount of slurry can be supplied to the wire and the cut face of the work by dividing the work into a plurality of blocks, no serious problem would happen.

Figure 3B:
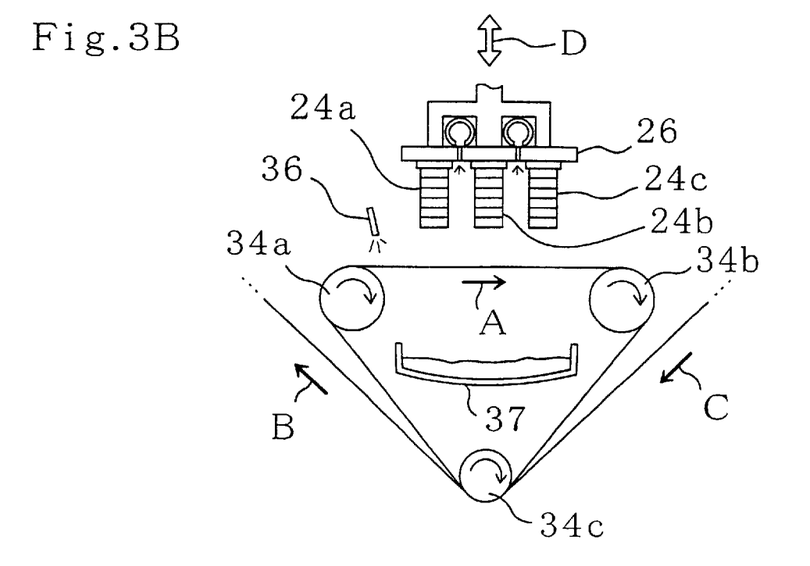
FIG. 3B is a front view thereof.

FIG. 3B will be referred to again. During the work cutting process, the work plate 26 is moved downward along the arrow D by a driver (not shown) at a predetermined speed, so that the work secured to the work plate 26 is pressed against the wire 32 running horizontally. By supplying a sufficient amount of slurry to between the work and the wire 32, the abrasive grains in the slurry are transported to between the work and the wire 32, thereby cutting the work. If the work plate 26 is lowered at a higher speed, then the cutting efficiency can be improved. However, since the cutting resistance increases in such a case, the wire 32 is likely to wave and the planarity of the cut face of the work possibly decreases. If the planarity of the cut face of the work decreases, then the time taken to perform polishing during a subsequent process step increases or defective products are formed at a higher percentage. Accordingly, it is necessary to set the lowering speed, or the cutting speed, of the work within an appropriate range. This point will be described in further detail later with reference to FIG. 9.

When the work is lowered downward, the wire 32 wound at a predetermined pitch grinds the work as a multi-wire saw, thereby simultaneously forming a large number of machined grooves (cut grooves) in the work and increasing the depth of the grooves as the machining proceeds. And when the machined grooves have completely passed through each ingot, the cutting process on the ingot is finished. As a result, a large number of wafers, each having a thickness determined by the pitch of the wire lines and the thickness of the wire, are sliced from the ingot simultaneously. After all the ingots 20 have been cut, the work plate 26 is lifted by the driver along the arrow D. Thereafter, the respective blocks are removed from the work plate 26 and then the cut wafers are removed from each block.

In this embodiment, the cutting process is carried out while lowering the work from above the wire 32. Accordingly, the ingots 20, which have already been cut, are still bonded to the work plate 26 with the adhesive 22 and lowered along with the work plate 26. In other words, the ingots 20, which have already been cut, are located under the wire 32. Accordingly, even if the cut portions of the work happen to separate or drop from the work, such portions never come into contact with the wire 32 again. Thus, the alloy plates already cut are passed to the next process step while maintaining high quality.

Figure 4:
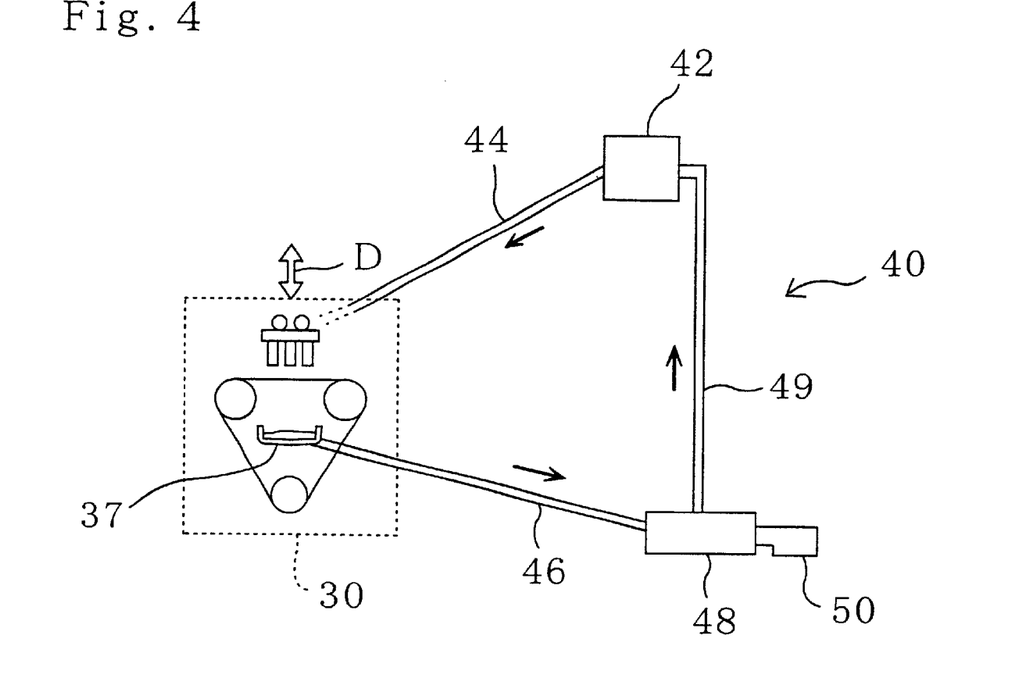
FIG. 4 is a schematic representation illustrating a slurry circulating system of the wire saw machine.

Next, the schematic arrangement of a slurry circulating system of the wire saw machine 40 will be described with reference to FIG. 4. As schematically shown in FIG. 4, the wire saw machine 40 includes a slurry circulating system for supplying the slurry to the main portion of the machine 40 and for recovering the used slurry containing the sludge involved with the machining.

In this machine 40, the slurry is supplied from a slurry supply tank 42 through a first slurry circulating pipe 44 into the slurry supply pipes 29 and the nozzle 36 shown in FIG. 3B during the cutting process of the work. The slurry, which has been used for cutting, drips from the machined part and the surrounding regions thereof so-as to be received by a recovering drain 37 located under the work plate 26. Then, the slurry is transported from the recovering drain 37 through a second slurry circulating pipe 46 into a recovery tank 48, where the slurry is subjected to a sludge separation process by a magnet separator 50 to be described later. The slurry, which has substantially regained its initial state before the cutting process, is transported through a third circulating pipe 49 into the slurry supply tank 42.

In this embodiment, while the supply and recovery of the slurry are performed in a cyclic fashion, the separation and removal (i.e., filtering) of the sludge are carried out efficiently in this manner. Accordingly, the slurry needs to be replaced with a considerably longer interval and the cutting process can be performed continuously for a very long period of time. Nevertheless, it is difficult to completely separate and remove all the sludge. Thus, the content of the sludge in the slurry supplied to the wire 32 gradually increases and the viscosity of the slurry also increases little by little correspondingly. Accordingly, in order to maintain the viscosity of the slurry within a desired range, new slurry is preferably supplied at appropriate time intervals. In such a case, the viscosity of the slurry may be actually measured at regular intervals and if the viscosity of the slurry is out of the defined range, then new slurry may be supplied to the machine (e.g., the slurry supply tank 42) as required. Such partial supply of the slurry is totally different from the conventional overall exchange of slurry in that this supply can be made without suspending the cutting process.

Figure 5:
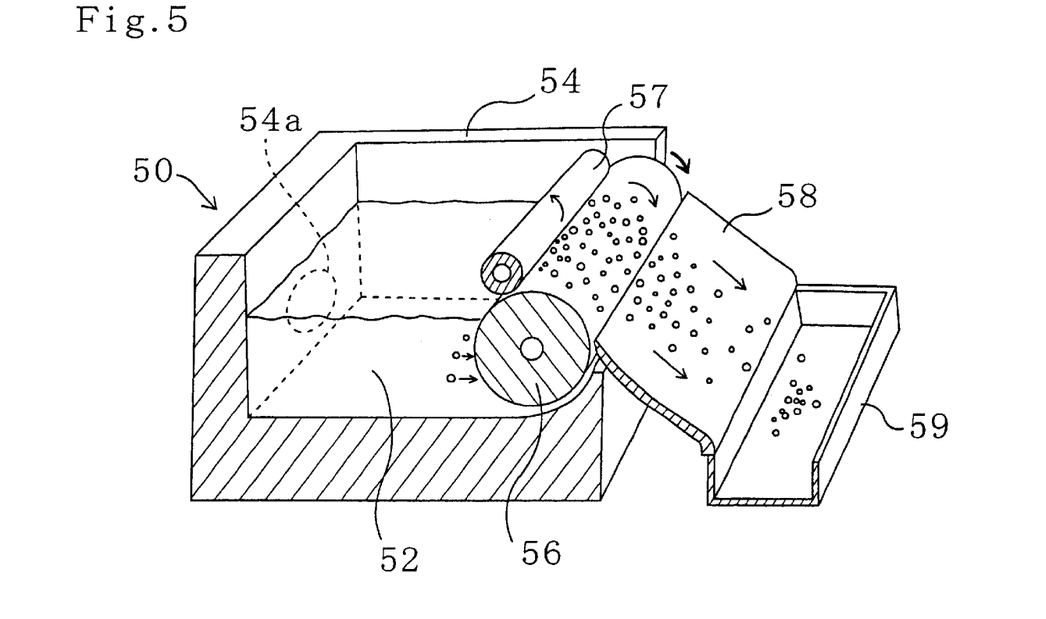
FIG. 5 is a perspective view illustrating a magnet separator provided for the wire saw machine.

Next, a magnet separator 50 will be described with reference to FIG. 5. This magnet separator 50 generates a magnetic field to separate the sludge from the used slurry (dirty liquid) 52 containing the sludge and reserved in a separation reservoir 54. The separation reservoir 54 is provided with an opening 54a, which is connected to the inside of the recovery tank 48 shown in FIG. 4. The magnet separator 50 includes: a drum 56 in which a strong magnet is disposed; and a squeezing roller 57 rotating while keeping in close contact with part of the outer circumference of the drum 56. The drum 56 is supported to be rotatable around a fixed axis and to be in partial contact with the slurry 52 in the separation reservoir 54. The squeezing roller 57 is made of oilproof rubber or the like and is pressed against the outer circumference of the drum 56 owing to the energizing force of a spring. When the drum 56 is rotated by a motor (not shown) in the direction indicated by the arrow, the rotation applies frictional force to the squeezing roller 57 and thereby rotationally drives the squeezing roller 57.

The sludge in the slurry 52 is attracted by the magnet in the drum 56 and attached to the outer circumference of the rotating drum 56. The sludge, attached to the outer circumference of the drum 56, is removed from the slurry 52 with the rotation of the drum 56, and then passes between the drum 56 and the squeezing roller 57. Then, the sludge is scraped off the surface of the drum 56 by a scraper 58 and then collected in a sludge box 59. An exemplary structure of means for removing sludge usable as the magnet separator 50 is disclosed, for example, in Japanese Utility Model Publication No. 63-23962. According to the results of experiments performed by the present inventors (described later), the magnetic field at the outer circumference (sludge recovery face) of the drum 56 in the slurry 52 is preferably set at 0.3 tesla or more to attract the rare earth alloy in the oil to the surface of the drum 56. Since the viscosity of the slurry is low in this embodiment, the magnet separator 50 can advantageously recover the sludge of the rare earth alloy easily. This is because a lot of sludge can be recovered more efficiently owing to the reduction in viscous drag applied to the sludge moving in a magnetic field formed in the slurry 52.

If the sludge is removed efficiently by using such a separator, then the viscosity of the slurry can be kept low. In addition, the cut load applied to the wire at the cut face of the work can be maintained at a sufficiently low level for a long period of time.

Figure 6A:
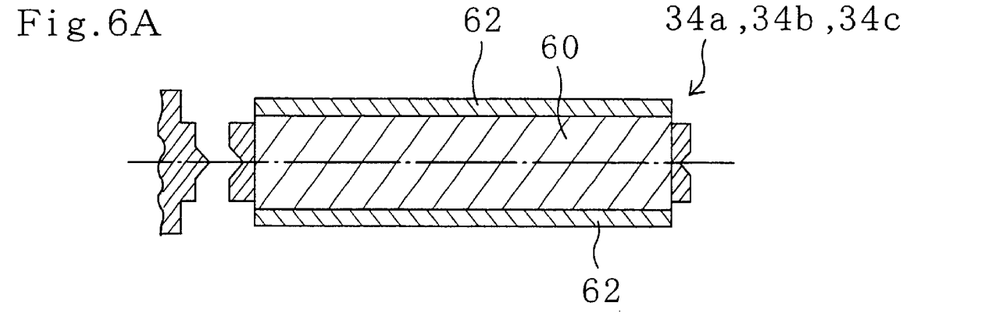
FIG. 6A is an axial cross-sectional view of a main roller.
Figure 6B:
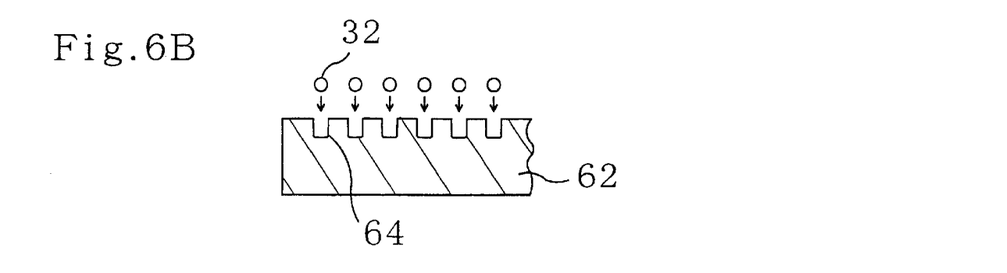
FIG. 6B is an axial cross-sectional view illustrating, on a larger scale, part of a cylindrical sleeve provided for the outer circumference of the main roller.

Next, the configuration of the main rollers 34a through 34c will be described with reference to FIGS. 6A and 6B. FIG. 6A illustrates the axial cross section of the main rollers 34a through 34c. FIG. 6B is an axial cross-sectional view illustrating, on a larger scale, part of a cylindrical sleeve provided for the outer circumference of the main rollers 34a through 34c.

In this embodiment, the sleeve 62 is made of urethane rubber. As shown in FIG. 6B, ring-shaped grooves 64 are provided at a predetermined pitch on the outer circumference of the sleeve 62. The wire 32 is engaged with the grooves 64 and wire lines are formed at a predetermined pitch. The sleeve 62 is adhered to the outer circumference of a cylindrical holder 60 and can rotate integrally with the holder 60. A pair of concave portions are provided for both end faces of the holder 60, which are rotatably supported by convex portions provided for the wire saw machine. FIGS. 3A and 3B show a state where a single wire 32 is wound around a large number of grooves 64 of the main rollers 34a through 34c.

The main rollers 34a through 34c of this embodiment are characterized by the material of the sleeve 62 and the depth of the grooves 64 formed in the sleeve 62. The sleeve 62 used in this embodiment is made of ester-based urethane rubber. In a conventional machine for cutting a silicon ingot with a wire saw, the sleeve is made of ether-based urethane rubber such that the grooves can be formed with higher precision. However, we confirmed based on experimental results that a sleeve made of ether-based urethane rubber is very likely to swell with respect to the slurry oil mainly composed of mineral oil used in this embodiment and adversely decreases the abrasion resistance of the rollers. Accordingly, such sleeves are unusable in only about 10 hours of continuous operation, and therefore far from being practically usable. The oil preferably used in this embodiment contains a surfactant or dispersant at a relatively low concentration. Accordingly, although the ether-based urethane rubber does not swell with respect to the slurry used for cutting a silicon ingot with a wire saw, the rubber seems to swell more easily with such an oil. Ester-based urethane rubber having high hardness is relatively expensive. However, the rubber should be used in order to enable a long-time continuous operation using the oil of this embodiment. If the main rollers are formed using the ester-based urethane rubber, then the surface of the rollers show high hardness. Accordingly, the machine can be operated for as long as about 700 hours substantially without causing the problem of swelling.

In the main rollers 34a through 34c of this embodiment, grooves 64 having a depth of 0.3 mm or more are formed. In cutting a silicon ingot with a conventional machine, the depth of the grooves is set at most at about 0.2 mm. However, if a viscous ingot such as an ingot of a rare earth alloy is machined with main rollers having such shallow grooves, then the wire is flexed to a large degree and frequently disengages from the grooves. As a result, the wire snaps because adjacent parts of the wire come into contact with each other. In contrast, if the depth of the grooves is set at 0.3 mm or more, such a problem can be eliminated.

Next, detailed parameters such as the speed of the wire, the viscosity of the slurry and the work cutting speed will be described with reference to FIGS. 7 through 11.

Figure 7:
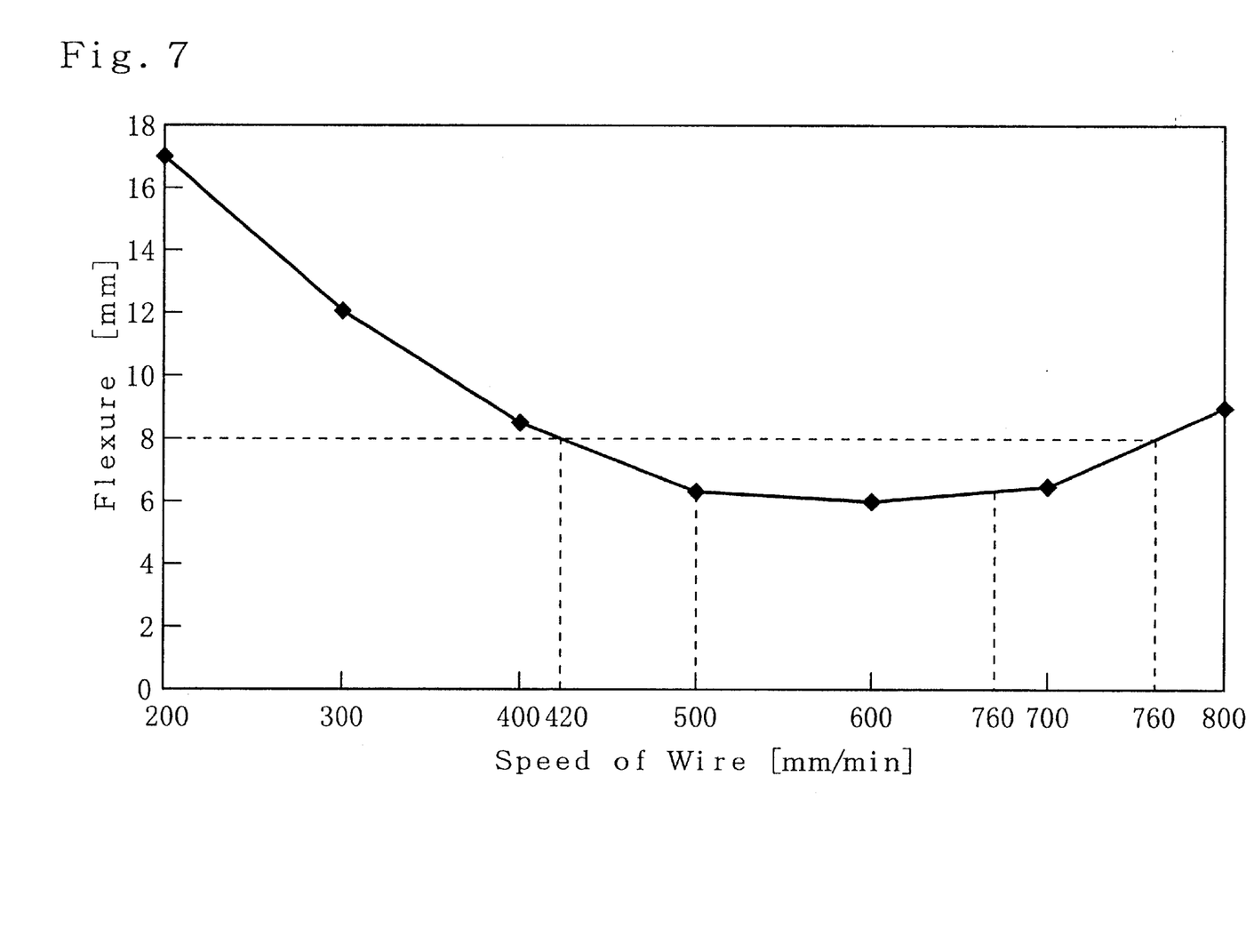
FIG. 7 is a graph illustrating a relationship between the flexure and the speed of a wire.

FIG. 7 illustrates a relationship between the flexure and the speed (i.e., the speed at which the wire is wound or runs) of a wire (diameter: 0.18 mmØ). The experiments were performed while setting the work lowering speed at a substantially constant value in the range from 15 mm/hr to 25 mm/hr. It is noted that similar results to those shown in FIG. 7 were obtained when the work lowering speed was in the range from 15 mm/hr to 30 mm/hr.

If work cutting with a wire does not proceed smoothly, then the flexure of the wire increases. This means that the cutting resistance of work is large and the work cannot be cut with satisfactory efficiency. Stated otherwise, if the flexure of a wire is small, then the work can be cut with good efficiency. As shown in FIG. 7, while the wire speed is within the range from 420 m/min. to 760 m/min., the flexure can be suppressed at 8 mm or less. On the other hand, while the wire speed is out of the range from 420 m/min. to 760 m/min., the flexure abruptly increases. If the wire speed is increased, then the depth of the cutting edge (i.e., the depth of a part of the rare earth alloy that is cut and ground by the abrasive grains on the wire) increases to a certain degree. However, when the wire speed is too much increased, a sufficient amount of slurry cannot reside on the wire and the depth of the cutting edge substantially decreases. While the wire speed is in the range from 500 m/min. to 670 m/min., the flexure settles at a minimum level. Accordingly, the wire speed is preferably set within the range from 420 m/min. to 760 m/min., more preferably within the range from 500 m/min. to 670 m/min.

Figure 8:
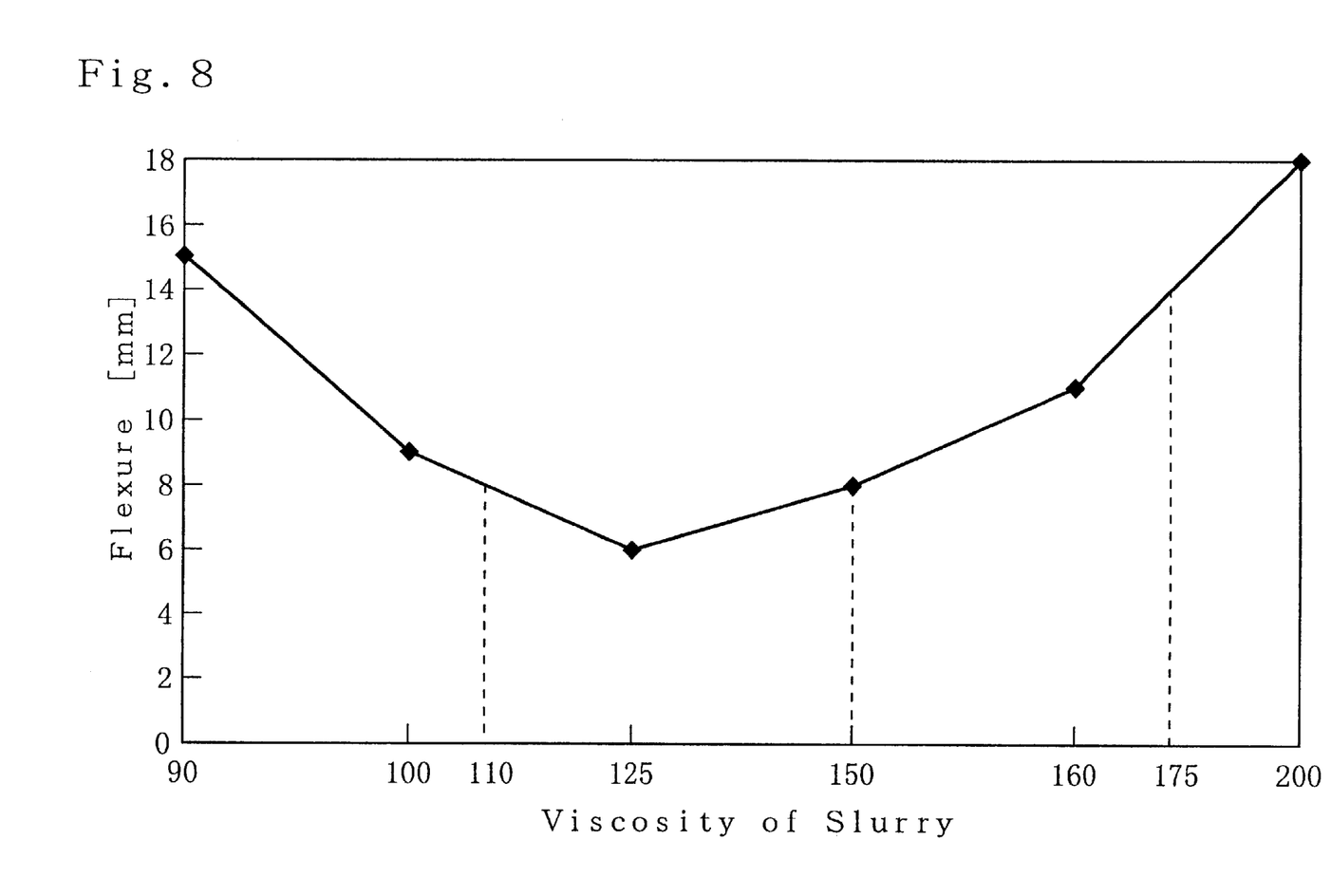
FIG. 8 is a graph illustrating a relationship between the flexure of a wire and the viscosity of slurry.

FIG. 8 illustrates a relationship between the flexure of a wire and the viscosity of slurry. As shown in FIG. 8, while the viscosity of the slurry at 25° C. is in the range from 92 mPa·sec. to 175 mPa·sec., the flexure is 14 mm or less and the cutting efficiency is satisfactory. In particular, while the viscosity of the slurry at 25° C. is in the range from 110 mPa·sec. to 150 mPa·sec., the flexure is 8 mm or less and the cutting efficiency reaches a more desirable level. If the viscosity of the slurry is high, the sludge of the rare earth alloy is likely to be deposited within the cut grooves of the work. Accordingly, the cutting resistance increases whereas the cutting efficiency decreases. As a result, the flexure of the wire adversely increases. In view of these factors, the viscosity of the slurry at 25° C. is set preferably within the range from 92 mPa·sec. to 175 mPa·sec., more preferably within the range from 110 mPa·sec. to 150 mPa·sec.

Figure 9:
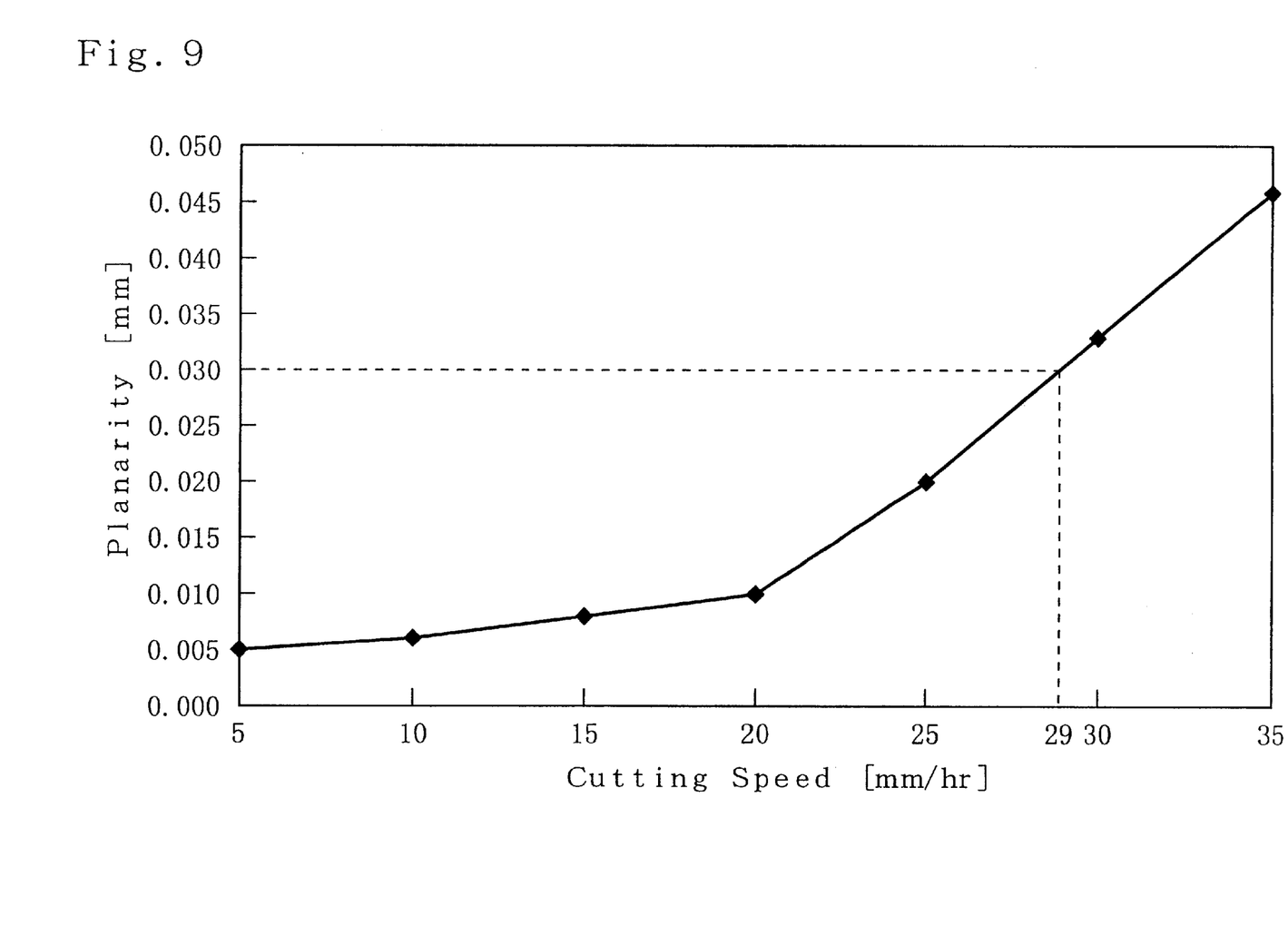
FIG. 9 is a graph illustrating a relationship between the work cutting speed and the planarity of a cut face of the work.

FIG. 9 illustrates a relationship between the work cutting speed and the planarity of a cut face of the work. The cutting speed corresponds to the lowering speed of the work or the work plate. As shown in FIG. 9, as the work cutting speed increases, the planarity of the cut face of the work deteriorates. Once the planarity exceeds 0.030 mm, the work efficiency decreases as a whole in view of the time required for a subsequent polishing process step. Accordingly, the planarity is preferably 0.030 mm or less, and the work cutting speed is also preferably adjusted such that the planarity of the machined face becomes 0.030 mm or less. Consequently, in this embodiment, the work cutting speed is preferably set at 29 mm/hr. or less.

Figure 10:
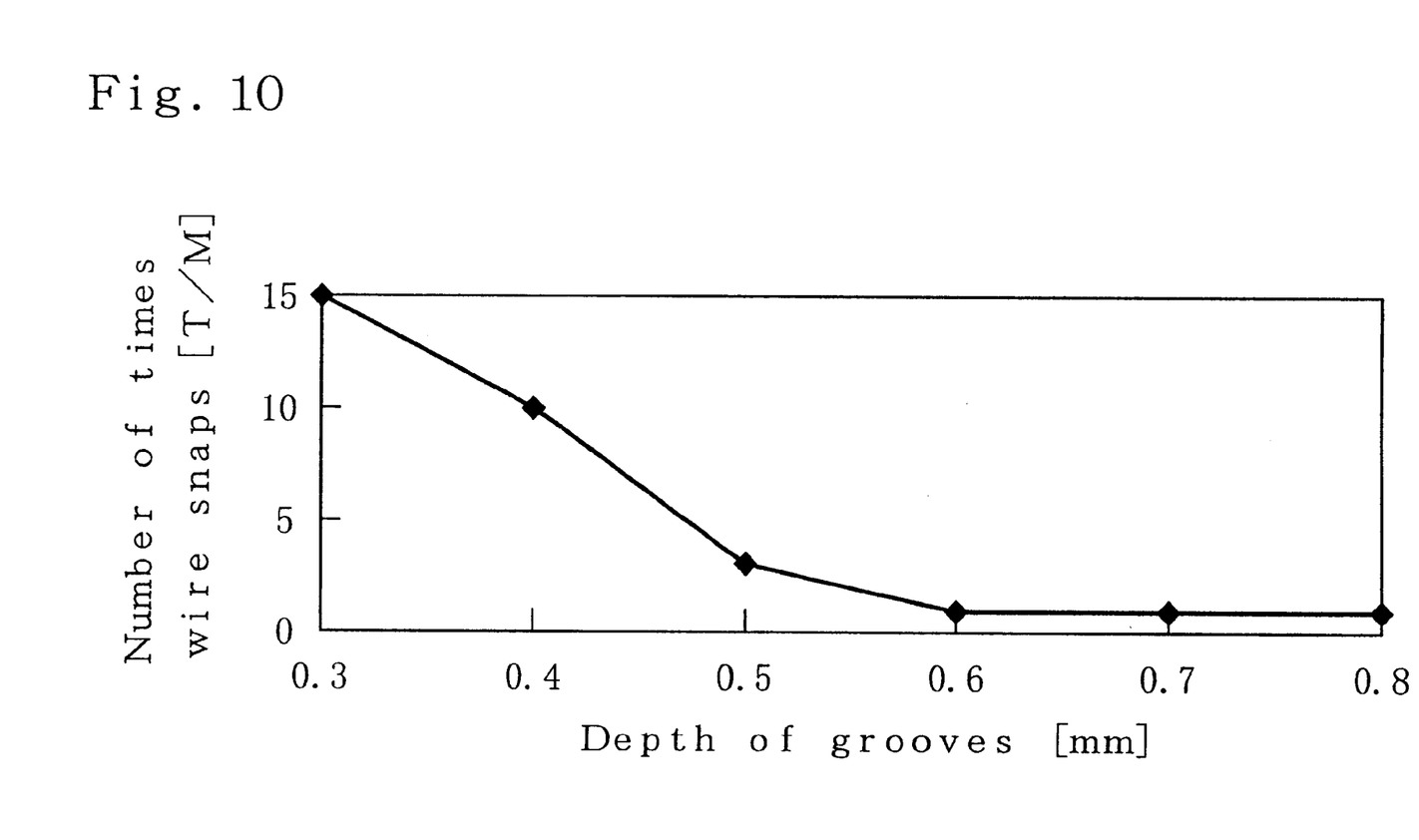
FIG. 10 is a graph illustrating a relationship between the number of times a wire snaps and the depth of grooves of a main roller.

FIG. 10 illustrates a relationship between the number of times a wire snaps and the depth of grooves of a main roller.

As shown in FIG. 10, if the depth of the grooves is 0.3 mm or more, the number of times wire snaps abruptly decreases. If the depth of the grooves of a main roller is 0.5 mm or more, the possibility of wire snapping is considerably lower. And if the depth of the grooves is 0.6 mm or more, snapping rarely occurs. Accordingly, the depth of the grooves needs to be 0.3 mm or more in practice and is preferably 0.5 mm or more and more preferably 0.6 mm or more. Though not shown in FIG. 10, if the depth of the grooves is less than 0.3 mm, the wire snaps 15 times or more a month.

Figure 11:
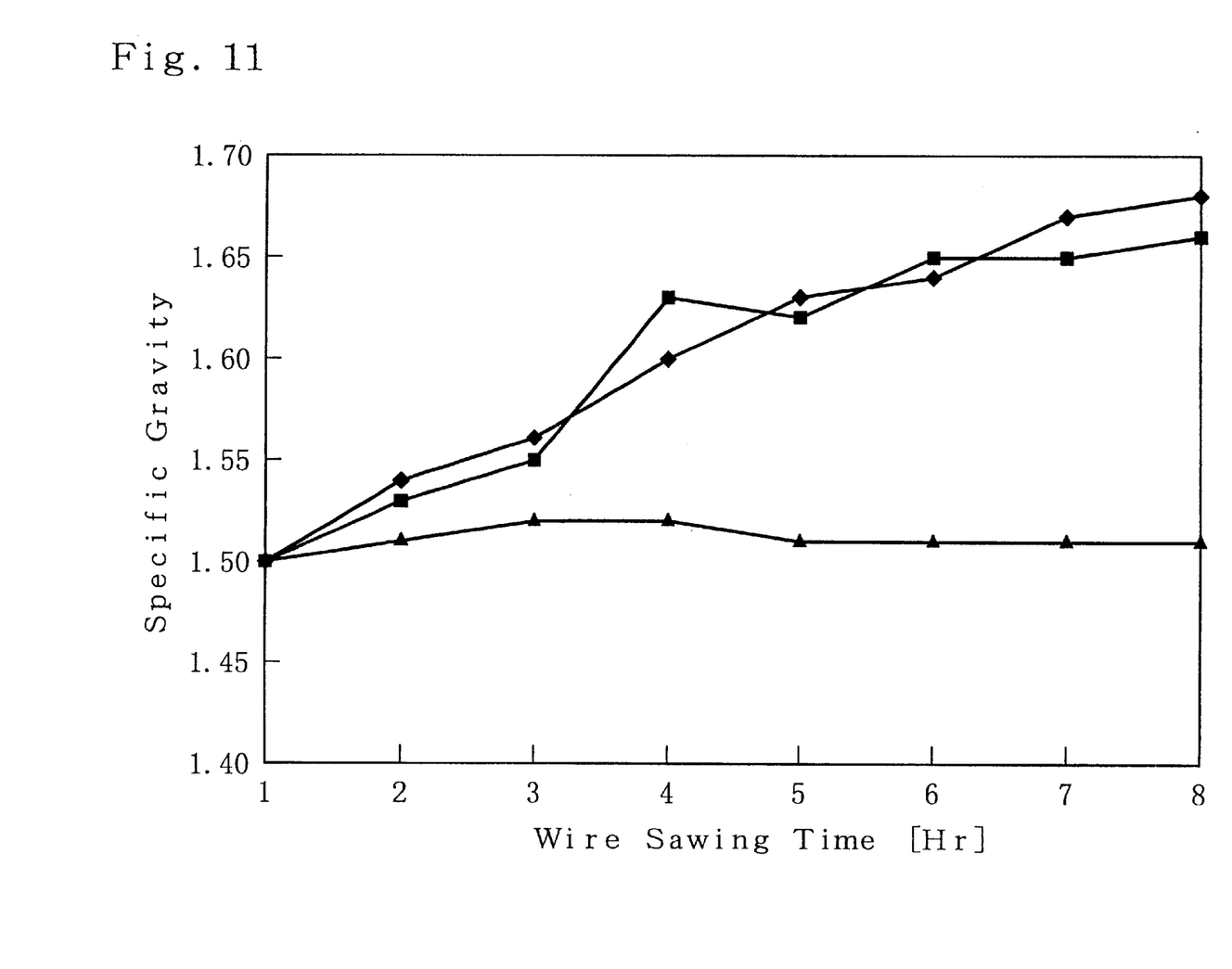
FIG. 11 is a graph illustrating how the specific gravity of slurry varies with a wire sawing time.

FIG. 11 is a graph illustrating how the specific gravity of slurry varies with a wire sawing time. The higher the concentration of the rare earth alloy sludge in the slurry is, the larger the specific gravity of the slurry is. In view of this phenomenon, we analyzed how the concentration of the sludge increases with the operation time of the machine. In FIG. 11, data about the following three cases are illustrated. Namely, a case where the magnet separator is not used is identified with ■; a case where a magnet separator applying a magnetic field of 0.1 tesla at the surface of the drum is identified with ♦; and a case where a magnet separator applying a magnetic field of 0.3 tesla at the surface of the drum is identified with ▲. As can be understood from FIG. 11, if the magnetic field applied at the surface of the drum is 0.3 tesla, then the specific gravity of the slurry is kept at a substantially constant level of about 1.5. This means that the sludge has been sufficiently separated and recovered and therefore a long-time continuous operation can be performed without totally replacing the slurry. It is noted that if the magnetic field strength is less than 1 tesla, then the wire snaps after the machining has been performed for four ours in the same way as in not using the magnet separator.

FIG. 1 will be referred to again. The rare earth alloy plates, which have been cut in the above-described manner, are finished by polishing to adjust the sizes and shapes thereof. Thereafter, in Step S8, these alloy plates are subjected to a surface treatment in order to improve the long-term reliability thereof. And in Step S9, a magnetic field strong enough to turn these alloy plates into permanent magnets is applied to these plates, which are passed through a testing process thereafter. A neodymium permanent magnet is completed in this manner.

As described above, the method for manufacturing rare earth alloy plates according to the present invention can attain the following numerous effects:

1. The slurry can be discharged from the cut face of the work with higher efficiency. Accordingly, the cutting resistance applied to the wire decreases and long-time continuous cutting is realized.
2. By preventing the wire from disengaging from the grooves of the main rollers, wire snapping can be avoided and the planarity of the cut face of the work can be improved. As a result, the production yield of the products can be increased.
3. The wire saw can cut the rare earth alloy with optimized efficiency.
4. A sufficient amount of slurry can be appropriately supplied to the cut face of the work and can be removed therefrom efficiently.
5. The sludge can be removed efficiently from the slurry. Accordingly, the cutting load applied to the wire at the cut face of the work can be reduced and the cutting speed thereof can be increased even if the slurry is not replaced so often.
6. Even if the work collapses, the quality of the products does not deteriorate because the products do not come into contact with the wire.

In the foregoing description, a preferred embodiment of the present invention have been described as being applied to a method for manufacturing rare earth alloy plates. However, the present invention is not limited to such an embodiment in any way. For example, the cutting method of the present invention is appropriately applicable to the manufacturing of rare earth alloy products and parts to have any other shape than plates through machining.

Also, in the foregoing embodiment, a material for a sintered rare earth magnet (i.e., Nd—Fe—B) is used as an object to be machined. However, the present invention can attain the same effects as those described in the foregoing embodiment even when any other rare earth alloy is used as an object to be machined. This is because rare earth alloys commonly have high cutting resistance and easily allow sludge to aggregate.

If rare earth alloy magnets are manufactured in accordance with the above-described method, the cutting margin may be smaller compared with cutting an ingot of a rare earth alloy using a peripheral cutting edge. Accordingly, the method of the present invention is suitable for manufacturing thinner magnets (having a thickness of 0.5 to 3.0 mm, for example). Recently, the thickness of a rare earth magnet used for a voice coil motor has been reduced year after year. Thus, if such a thin rare earth alloy magnet manufactured by the method of the present invention is attached to a voice coil motor, a high-performance downsized voice coil motor can be provided.

According to the present invention, even when a rare earth alloy is cut with a wire saw, wire snapping can be prevented and the slurry needs to be replaced a considerably fewer number of times. As a result, the machine can be operated continuously for a much longer period of time.

What is claimed:

1. A method for cutting a rare earth alloy sintered magnet including an Nd—Fe—B compound, comprising the steps of:

a) supplying slurry containing abrasive grains onto a wire from a slurry supply tank;

b) machining the rare earth alloy sintered magnet with the abrasive grains, interposed between the wire and magnet, by running and pressing the wire against the magnet to produce a plurality of rare earth alloy plates each having two cut surfaces that are parallel with each other;

c) removing sludge of the rare earth alloy sintered magnet out of the slurry to maintain a viscosity of the slurry within a predetermined range; and d) transporting the slurry containing the abrasive grains from which the sludge has been removed so that the viscosity of the slurry is set within the predetermined range to the slurry supply tank, wherein the slurry containing the abrasive grains is circulated through a path including the slurry tank and a place where the machining is performed so that the machining step can be performed continuously.

2. The method of claim 1, wherein the removal of the sludge out of the slurry is carried out by using a magnetic field.

3. The method of claim 2, wherein the predetermined range of the viscosity of the slurry is from 92 to 175 to mPa·sec at 25° C.

4. The method of claim 2 or 3, further comprising a step of supplying new slurry in which the sludge of the rare earth alloy sintered magnet is not included.

5. The method of claim 2 or 3, wherein the machining step b) is conducted while lowering the magnet against the wire.

6. A method for manufacturing rare earth alloy magnets including an Nd—Fe—B compound, comprising the steps of:

a) making a sinter out of a rare earth magnetic alloy powder; and b) separating a plurality of rare earth alloy magnets from the sinter, each of said magnets having a shape of a plate, said separating step comprising the steps of;

supplying slurry containing abrasive grains onto a wire from a slurry supply tank;

machining the sinter with the abrasive grains, interposed between the wire and the sinter, by running and pressing the wire against the sinter to produce said magnets each having two cut surfaces that are parallel with each other;

c) removing sludge of the sinter out of the slurry to maintain a viscosity of the slurry within a predetermined range; and d) transporting the slurry containing the abrasive grains from which the sludge has been removed so that the viscosity of the slurry is set within the predetermined range to the slurry supply tank, wherein the slurry containing the abrasive grains is circulated through a path including the slurry tank and a place where the machining is performed so that the machining step can be performed continuously.

7. The method of claim 6, wherein the removal of the sludge out of the slurry is carried out by using a magnetic field.

8. The method of claim 6 or 7, wherein the predetermined range of the viscosity of the slurry is from 92 to 175 mPa·sec at 25° C.

9. The method of claim 6 or 7 further comprising a step of supplying new slurry in which the sludge of the rare earth alloy sintered magnet is not included.

10. The method of claim 6 or 7, wherein the machining step is conducted while, lowering the sinter against the wire.

* * * * *